(12) United States Patent
Bogart et al.

(10) Patent No.: US 8,002,565 B2
(45) Date of Patent: Aug. 23, 2011

(54) WATERPROOF CONNECTOR KIT USEFUL FOR AIRFIELD LIGHTING APPLICATIONS

(75) Inventors: John A. Bogart, Oxford, CT (US); Paul A. Kish, Hanover Township, PA (US)

(73) Assignee: Integro, LLC, New Britain, CT (US)

( * ) Notice: Subject to any disclaimer, the term of this patent is extended or adjusted under 35 U.S.C. 154(b) by 2 days.

(21) Appl. No.: 12/655,336

(22) Filed: Dec. 29, 2009

(65) Prior Publication Data
US 2010/0184318 A1 Jul. 22, 2010

Related U.S. Application Data

(60) Provisional application No. 61/146,426, filed on Jan. 22, 2009.

(51) Int. Cl.
*H01R 13/52* (2006.01)
(52) U.S. Cl. .................. 439/281; 439/447
(58) Field of Classification Search .............. 439/278, 439/281, 282, 447, 519, 521, 604
See application file for complete search history.

(56) References Cited

U.S. PATENT DOCUMENTS

| | | | | |
|---|---|---|---|---|
| 3,020,516 A | * | 2/1962 | Despard | 439/416 |
| 3,994,553 A | * | 11/1976 | Kornick | 439/281 |
| 4,006,288 A | | 2/1977 | Stevens | 174/73.1 |
| 4,019,167 A | | 4/1977 | Barker | 336/96 |
| 5,717,185 A | | 2/1998 | Smith | 218/154 |
| 5,808,258 A | | 9/1998 | Luzzi | 218/136 |
| 5,868,584 A | | 2/1999 | Cook et al. | 439/98 |
| 6,113,245 A | | 9/2000 | Reinert, Sr. | 362/153.1 |

OTHER PUBLICATIONS

U.S. Department of Transportation Advisory Circular, "FAA Specification for L-823 Plug and Receptacle, Cable Connectors," Apr. 2000.
U.S. Department of Transportation Advisory Circular, "Specification for Series to Series Isolation Transformers for Airport Lighting Systems," Jun. 2005.
Federal Aviation Administration, Engineering Brief #64A, "Runway Status Lights System," Feb. 2007.

* cited by examiner

*Primary Examiner* — Khiem Nguyen
(74) *Attorney, Agent, or Firm* — Wiggin and Dana LLP; Gregory S. Rosenblatt

(57) ABSTRACT

A waterproof electrical connector for airfield lighting applications has a connector body with a first end and an opposing second end. The first end terminates at a first end cap that has a strain/bend relief feature and a first bore for receiving a cable that extends into the first end. At least one O-Ring extends from the walls of the first bore. The opposing second end terminates at a second end cap and has a second bore extending through the second end cap and into the second end. A sleeve is affixed to an exterior surface of the second end cap. An electrically insulated cable is inserted into the first bore engaging the O-Rings to form a waterproof seal. An electrical contact engages the second end cap and the sleeve folds over the second end cap to engage a surface of this contact forming a waterproof seal.

14 Claims, 7 Drawing Sheets

AS RECEIVED:

AS INSPECTED:

AS RECEIVED:

AS INSPECTED:

US 8,002,565 B2

WATERPROOF CONNECTOR KIT USEFUL FOR AIRFIELD LIGHTING APPLICATIONS

CROSS REFERENCE TO RELATED APPLICATION(S)

This patent application claims priority to U.S. Provisional Patent Application Ser. No. 61/146,426, titled "Waterproof Connector Kit Useful for Airfield Lighting Applications" that was filed on Jan. 22, 2009. The subject matter of Ser. No. 61/146,426 is incorporated by reference herein in its entirety.

U.S. GOVERNMENT RIGHTS

N.A.

BACKGROUND

1. Field of the Disclosure

This invention relates to connectors to electrically couple two or more components of a system. More particularly, there is disclosed a waterproof connector useful in a runway lighting system.

2. Description of the Related Art

Airport ground lighting systems are networks of lights and circuits that help guide aircraft in take-off, landing and taxiing along the runways and taxiways of an airfield. They play a vital role in keeping air travel safe. The luminous portion of the system consists of elevated lights and lighted signs at the side of runways and taxiways and inset lights which are embedded in the airport surfaces. A commercial airport in a large metropolitan area will have several hundred to several thousand lights of various types installed around the facility.

In a typical runway lighting system, an underground cable provides electrical power in series to a plurality of lighting fixtures. To prevent the failure of a single lighting fixture from causing the entire plurality of lighting fixtures to go out, an isolation transformer is disposed between the power source cable and the lighting fixture. The leads and connectors of this transformer are integrally molded into the transformer. A set of field-installed electrical connectors (typically one socket and one plug) is used to electrically connect the isolation transformer primary coil to the airport power circuit. As this connection is subsurface, it must be waterproof and impervious to other liquids commonly found in a runway environment such as jet fuel and deicing solution.

When a lighting fixture is to be added or replaced, the electrical connection needs to be made waterproof. Installation of a primary connector kit does not always yield a waterproof connection. Therefore, of common present use is a heat shrink kit. A plastic film that contracts when exposed to moderate heat is wrapped around the connection and then exposed to a hot air gun, or similar heat source, to then shrink about the connection forming a waterproof casing. However, this is a very time-consuming process that requires additional equipment and as a runway is typically out of service when lighting fixtures are being replaced, any delay in the installation of the lighting fixtures affects the profitability of the airport. In addition, the waterproof properties of a heat shrink casing are inconsistent and affected by the skill of the installer. Also, as the polymer shrinkage is nonreversible, the entire connection must be destroyed and replaced when testing a circuit and frequently, during the process to remove the heat shrink, the isolation transformer primary connectors are damaged and often the isolation transformer must be replaced.

A runway lighting system having a light fixture with a luminous portion slightly raised above the surface of a runway and an electric cable extending downward to a power source is disclosed in U.S. Pat. No. 6,113,245 to Reinert, Sr.

U.S. Pat. No. 5,868,584 to Cook, et al. discloses a pin-to-socket connector where each component has a retractable sleeve that can be stretched over the other retractable sleeve to form a waterproof, insulated interference fit. Both U.S. Pat. Nos. 5,868,584 and 6,113,245 are incorporated by reference in their entireties herein.

There remains, therefore, a need for a waterproof connector for a runway lighting system that is quick to assemble, easy to assemble and reusable.

BRIEF SUMMARY OF THE INVENTION

The details of one or more embodiments of the invention are set forth in the accompanying drawings and the description below. Other features, objects and advantages of the invention will be apparent from the description and drawings, and from the claims.

In accordance with a first embodiment described hereinbelow, a waterproof electrical connector is disclosed in both a "plug" version and a "socket" version useful for airfield lighting applications. Each version has a connector body with a first end and an opposing second end. The first end is adapted to accept an electrically insulated cable and the second end is adapted to receive an electrical contact.

The first end terminates at a molded plastic end cap formed from an electrically insulating material. When an electrically insulating cable is inserted into the molded plastic end cap, the cable usually bends at 90+ degrees, which tends to stretch and open the connector, creating a water entry point. A molded bend/strain relief extends from the back of the connector. The improvement is designed to absorb the strain from the cable bending and to guarantee the cable is positioned appropriately as it enters the back of the connector. In addition, integrally molded o-rings having an inner diameter appropriate to the cable outer diameter deform around the cable insulation to form a waterproof seal.

The second end terminates at a second molded plastic end cap formed from an electrically insulating material. A sleeve formed from an electrically insulating material, extends beyond this second end cap. When the connector is assembled to its appropriate mate, the sleeve folds over an exterior surface of the mate and snaps in place over a designed ridge forming a waterproof seal.

BRIEF DESCRIPTION OF THE DRAWINGS

Like reference numbers and designations in the various drawings indicated like elements.

DETAILED DESCRIPTION

Figure 1:
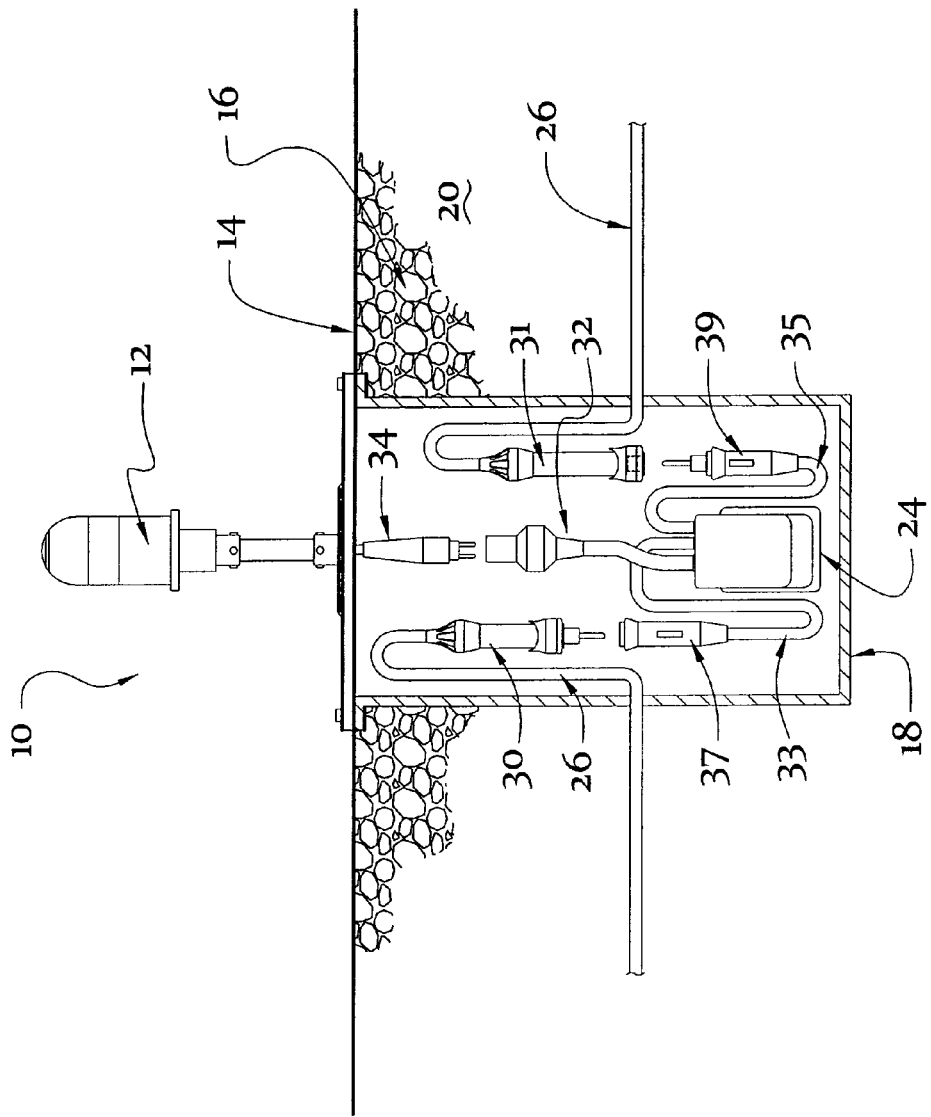
FIG. 1 illustrates a runway lighting fixture in cross-sectional representation.

A runway lighting fixture 10 that is a component of a runway lighting system is illustrated in FIG. 1. A light 12 may be mounted flush with or elevated above an outer surface 14 of a runway 16. The runway 16 is typically paved and formed from a material such as bitumen or concrete. Lighting fixture housing 18, known as a base can, extends downward from the light 12 through the runway 16 and into the underlying ground 20. Contained within the lighting fixture base can 18 are an isolation transformer 24 and male and female connectors of a primary connector kit 30, 31. The isolation transformer 24 has a secondary output connector 32 which couples with a secondary input connector 34 of the light 12 electrically coupling the light 12 with the output (secondary) coil of the isolation transformer. The isolation transformer 24 has primary input and output leads 33, 35 and connectors 37, 39 electrically coupled with the primary coil of the isolation transformer 24. The two connectors 37, 39 and leads 33, 35 are typically integrally molded onto the isolation transformer 24. A subsurface primary power line 26 provides power in series to a plurality of runway lighting fixtures 10. Field installed pin-type connector 30 and socket-type connector 31 electrically couple the isolation transformer 24 into the subsurface primary power line 26.

The pin-type connector 30 and the socket-type connector 31 are typically located inside the lighting fixture base can 18. The surrounding environment frequently has a high moisture content, and may be below the water table. If the connections are not waterproof, current leakage to the ground may occur. Current leakage leads to a low current reading at the light 12 and diminished lighting performance.

Figure 2:
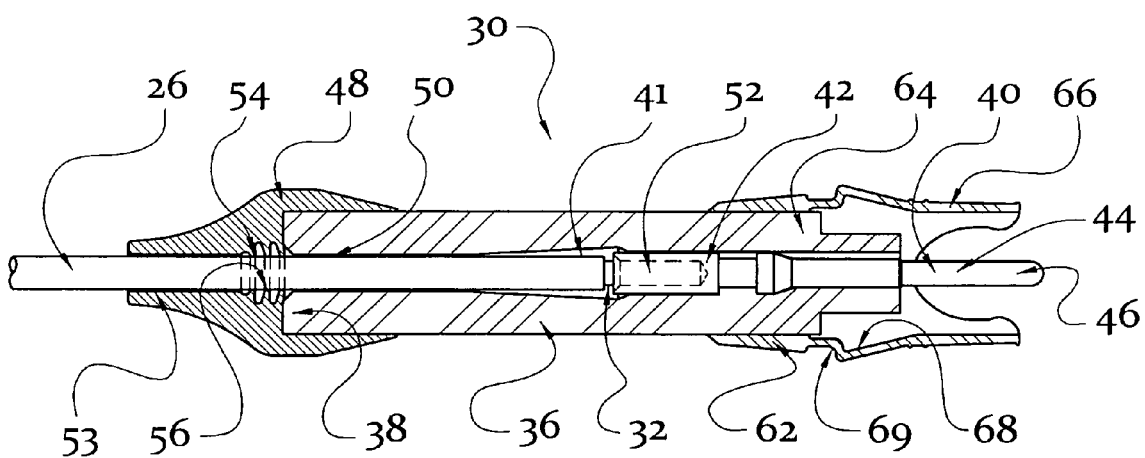
FIG. 2 illustrates a first connector for use with a runway lighting system.

With reference to FIG. 2, a pin-type connector 30 encases a conductive pin 40. A first end 42 of the conductive pin 40 is adapted to receive the bare copper portion 32 of a cable that has had the outer insulation 41 stripped back. Typically, in a runway lighting system application, the cable will be a portion of the sub-surface primary power line 26. An opposing second end 44 of the conductive pin 40 terminates at a prong 46 sized to engage a socket portion of the isolation transformer primary connector (e.g. 37 in FIG. 1). The connector body 36 is formed from a durable water resistant and chemically resistant insulating material such as a thermoplastic vulcanizate (TPV) in the thermoplastic elastomer (TPE) family such as Santoprene (Trademark of Exxon Mobil Chemical of Houston, Tex.) or Evoprene (AlphaGary Corp. Leominster, Mass.).

A first end cap 48 designed to be a strain/bend relief for cable entry extends around a first end 38 of the connector body 36. The first end cap 48 may be a discrete piece hermetically joined to the first end or may be integrally molded as a portion of the first end 38. A through bore 50 extends through the first end cap 48 and into the first end 38. The through bore 50 is axially aligned with the cable receiving aperture 52 of the conductive pin 40. An exterior end of the through bore 50 may be outwardly flared 53 to assist with insertion of a cable. At least one O-ring 54 extends from the walls 56 of the through bore 50 and is effective to form a waterproof seal with the insulation jacket of the inserted cable. Preferably, there are a plurality of axially aligned O-rings 54 either secured by the walls 56 of through bore 50 or integrally molded as protrusions of the walls 56. Preferably, the first end cap 48 and O-rings 54 are formed from the same TPV as the connector body 36.

Figure 3:
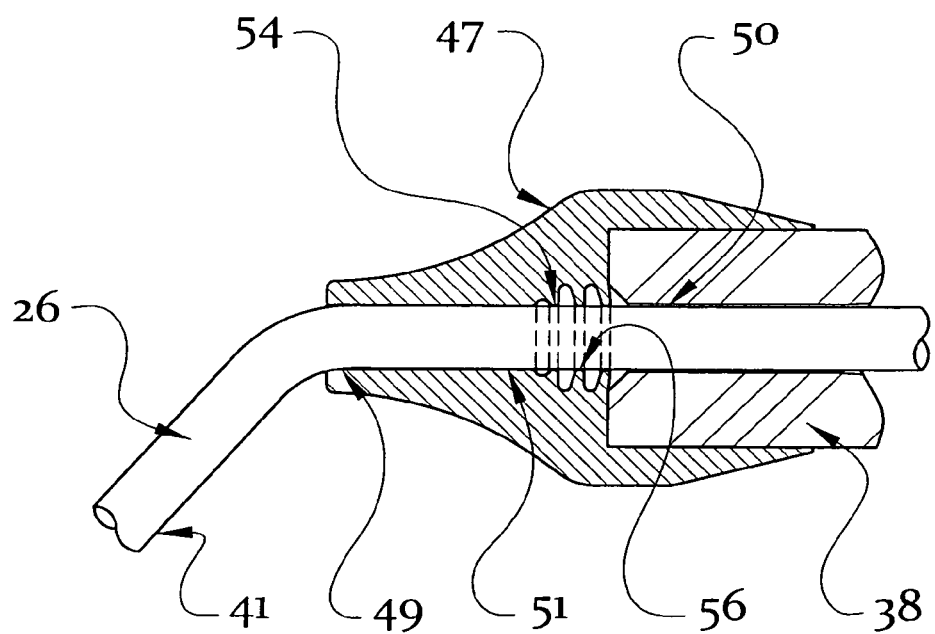
FIG. 3 is an enlarged view of one end of the connector illustrated in FIG. 2.

With reference to FIG. 3, the sub-surface primary power line 26 has a conductive core surrounded by an insulation jacket 41. Due to manufacturing tolerances, the outside diameter of the insulation jacket 41 of the same sized AWG cables can vary from power line to power line. This variation may be on the order of +/−0.15 inch. The through bore 50 must have a diameter sufficiently large to accept the maximum diameter of insulation jacket 41 that is within specified tolerances. As a result, for any insulation jacket diameter less than that maximum, a gap exists between the walls 56 and insulation jacket 41. The O-rings 54 prevent egress of water along this gap by forming a watertight compression fit along the walls of the insulation jacket. In addition, a molded bend/strain relief 47 extends from the back of the connector 38. It is common for the cable 26 to bend at 90+ degrees as it exits the back of the connector 38, thereby stretching and opening the back of the connector 38, thus creating a water entry point. The disclosed design absorbs the strain from the cable bending 49 and guarantees the cable is positioned appropriately 51 as it enters the back of the connector 38.

Referring back to FIG. 2, a second end cap 62 extends around the second end 64 of the connector body 36. This second end cap 62 may be affixed to the second end 64 or integrally formed, such as by molding. The second end cap 62 includes a rollback sleeve 66 that is sufficiently flexible to be folded back over the connector body 36 or extended outward from the second end 64. When extended outward, the rollback sleeve 66 has a length sufficient to extend over a designed ridge of an isolation transformer primary connector (e.g. 37 of FIG. 1) to form a waterproof seal between the pin-type connector 30 and the isolation transformer primary connector 37. To facilitate gripping of the rollback sleeve 66 and to increase flexibility, a mid-portion 68 of the rollback sleeve 66 may have a reduced thickness.

Both the second end cap 62 and the rollback sleeve 66 are formed from a water and chemically resistant material and are both preferably TPV. In a preferred embodiment, the second end cap 64 and the rollback sleeve 66 are formed from the same material as the connector body 36.

Figure 4:
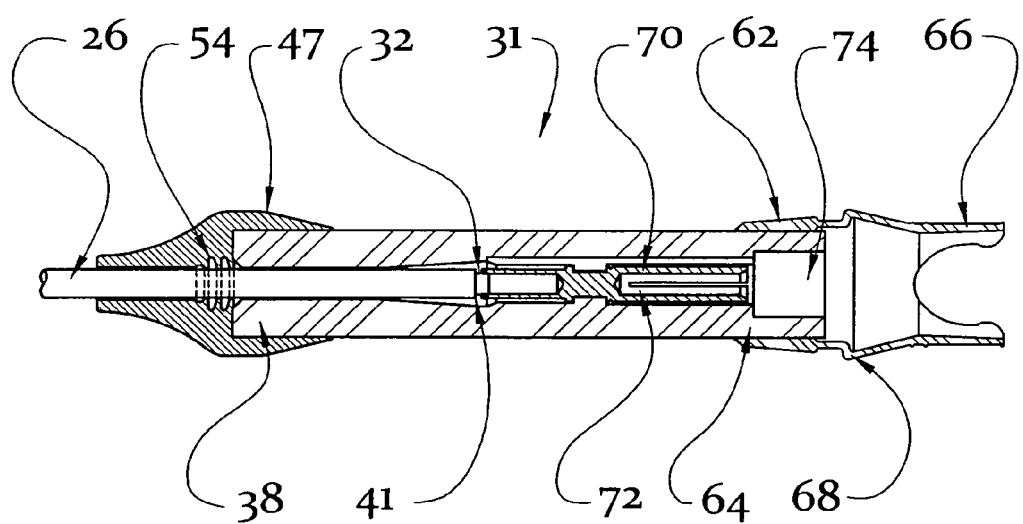
FIG. 4 illustrates a second connector for use with a runway lighting system.

FIG. 4 illustrates a socket-type connector 31 to electrically couple a primary power line 26. The primary power line 26 is a cable having an electrically conductive core 32 encased in electrical insulation 41. Consistent with the connector described above, a plurality of compliant O-rings 54 insure a waterproof fit over a wide range of cable diameters that may be used with the installation. In addition, a molded bend/strain relief 47 absorbs the strain from the cable bending, thereby eliminating stretching or opening at the back of the connector 38, which can create a water entry point, thus guaranteeing the cable 26 is positioned appropriately as it enters the back of the connector 38. The second end cap 62 is either affixed to or molded around the second end 64. The second end terminates at an electrically conductive socket sized to receive a pin at inner socket portion 72 and pin housing at outer socket portion 74. Consistent with the connector described above, the rollback sleeve 66 is folded back over the body of connector 31 when not in use and extended over a designed ridge of an isolation transformer primary connector to thereby form a waterproof seal when in use. To facilitate the formation of a waterproof seal, the rollback sleeve 66 includes tabs to pull securely closed when assembled to the mating connector (FIG. 5) and also has a reduced thickness mid-portion 68 to increase flexibility.

Figure 5:
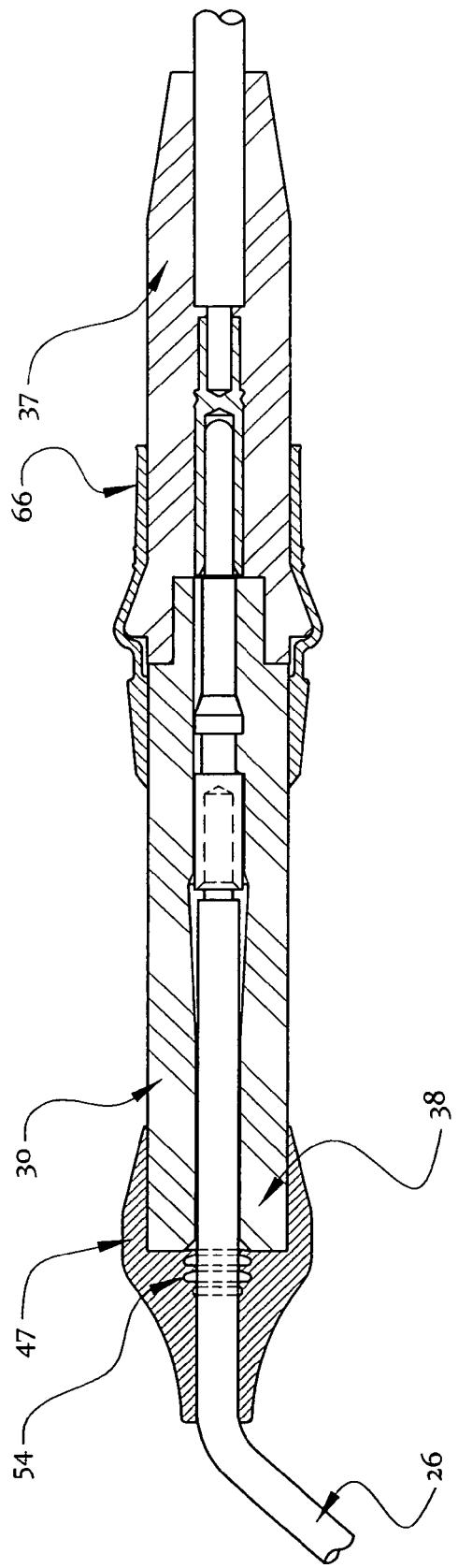
FIG. 5 illustrates the connection between the connector of FIG. 2 and an isolation transformer.

FIG. 5 illustrates a pin-type connector 30 that is assembled to a primary power line 26 engaged to an isolation transformer primary connector 37 further illustrating the water-resistance achieved by the o-rings 54 and roll-back sleeve 66, as well as the appropriate cable positioning 26 achieved by the molded bend/strain relief 47.

Figure 6:
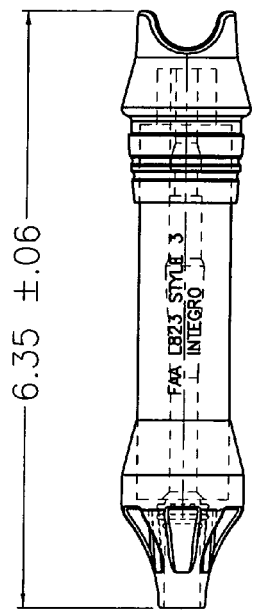
FIG. 6 provides additional details about a connector in accordance with another embodiment of the disclosure.
Figure 6:
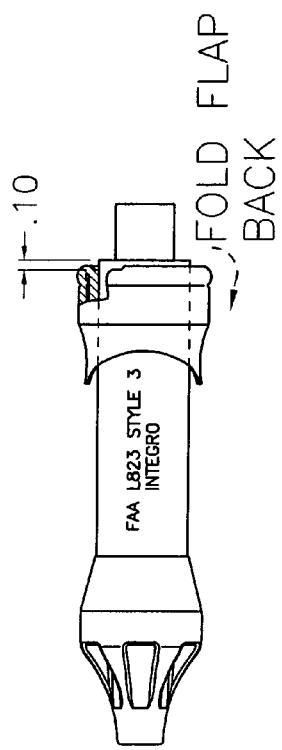
Figure 7:
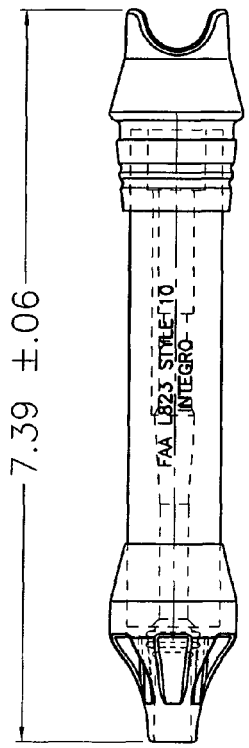
FIG. 7 provides additional details about a connector in accordance with yet another embodiment of the disclosure.
Figure 7:
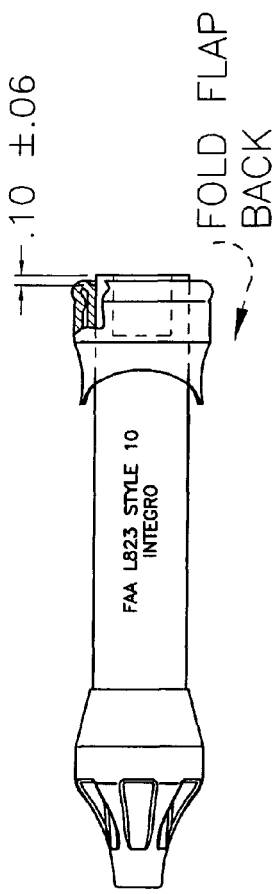

FIGS. 6 and 7 provide additional details of preferred sealing and manufacturing information related to the connectors described herein. The following notes apply to FIG. 6 and FIG. 7:

1. Reference FAA AC 150/5345-26 Type 1 Class B Style 3 (for FIG. 6) and reference FAA AC 150/5345-26 Type 1 Class B Style 10 (for FIG. 7).
2. Chemically weld item 1 to item 3 by dipping cable end into trichloroethylene CAS79-01-6 for a minimum of 60 seconds, then immediately slide on item 2 onto cable end of kit body until completely seated as shown.
3. Chemically weld item 1 to item 3 by dipping connector end into trichloroethylene CAS79-01-6 for a minimum of 60 seconds, then immediately slide on item 3 onto connector end of kit body until completely seated as shown.
4. Inspection: Visual.
5. Material: Evoprene G963-5156, black obtainable from Alphagary Corp or approved substitute.
6. No flashing or voids permissible on finished product.
7. Cavity identification size and location to be approved by engineering.
8. Part No. Cable Diameter
8-11805-01-1 0.238-0.273
8-11805-01-2 0.320-0.430
8-11805-01-3 0.460-0.585

While the connector described hereinabove provides one embodiment of a waterproof electrical connector having particular use in runway lighting systems, various alternative solutions may be utilized as alternatives or enhancements to the disclosed features. For example, an exterior collar may be utilized. This would be a separate piece that fits over and secures together the two connector components after they are coupled. It may have raised grooves that fit into recesses in the outer diameters of the insulators to keep all parts in their places. It may snap together, in clamshell form, or fit together securely in other ways such as screws, adhesives and tie wraps.

The connector components and the joint between them may be taped to insure that they are sealed from the outside world and securely held together. This is presently done in some cases where a rubberized tape or plastic electrical tape is utilized.

An integral collar like a military standard connector would require a second piece on each connector that together forms a connector set of threaded collars that can be tightened after the connectors are mated, positively securing the two parts together and somewhat compressing the mating faces together to maintain a tight, sealed, yet repeatably separable interface.

O-ring type grooves and mating faces would entail molding in a groove in one of the connector mating faces in a corresponding ridge (O-ring) and the other to provide a mechanical seal to augment a pure interference fit of the mating faces.

The connection between insulators can be filled with or coated with a room temperature cured silicone that will seal the connection and also serve as a kind of adhesive to keep the connectors mated under stress.

The two insulators can be sealed together using a solvent adhesive, essentially gluing them to form a permanent bond. The insulators and their mating sections can be made in such a way to allow for them to be epoxy filled after a connection is made.

After a connection is made, the mating connectors can be covered and sealed together with a heat shrinkable tubing, with either adhesive along the entire length or at the end only.

An alternative approach is to use a cold shrink sleeve to achieve the same end although without an integral adhesive layer.

The insulator to cable bond may be further enhanced by a "liquid-tight" type strain relief seal. The wire entry end in the connector could be outfitted with a threaded end within which is a partially collapsible structure that will compress over and seal onto the cable jacket as a specialty design that is tightened onto the thread. This is referred to as a "liquid-tight" strain relief.

The wire entry site of the connector could be made with a cone-shaped inner and outer surface that could be cut to accommodate different cable outside diameters that provide an interference fit for range of cable outside diameters.

To utilize the grommet sealing with a nut, the wire entry end can be made with a harder threaded protrusion that has a slightly conical inside diameter. The cable would be passed through an appropriately sized grommet, formed from rubber or similar material, and then through the protrusion. The grommet would be forced onto the conical shape and compressed around the cable when an appropriately sized nut, complete with a hole through which the cable will also pass, is tightened onto the threaded protrusion. As described in U.S. Pat. No. 5,868,584, the wire entry section may be held at expanded diameter by a stretching device which is removed after the cable is installed. The connector body then recovers its original dimensions sealing around the cable outside diameter. A number of materials described above for the mating faces of the connectors can be used to seal and secure the cable into the connector bodies as well, such as silicone RTV, a bonding agent, a quasi-epoxy, and heat shrink and tape.

One or more embodiments of the present invention have been described. Nevertheless, it will be understood that various modifications may be made without departing from the spirit and scope of the invention, to create a connector that is waterproof without the use of additional materials, such as heat shrink, thereby reducing time of installation and providing an improvement in airfield lighting. Accordingly, other embodiments are within the scope of the following claims.

What is claimed is:

1. An electrical connector, comprising:
    a connector body having a first end and an opposing second end thereof;
    said first end adapted to receive a first electrically insulated cable terminating at a first molded plastic end cap, said first molded plastic end cap having a maximum thickness adjacent said first end of said connector body and also having a through bore with a diameter greater than a diameter of said first electrically insulated cable;
    said second end adapted to receive a second electrically insulated cable, wherein said second end terminates at a second molded plastic end cap formed from an electrically insulating material and having a first end portion bonded to said connector body and a second end portion extending beyond said connector body; and
    a sleeve affixed to an exterior surface of said second end formed from an electrically insulating material and extending beyond said second end portion.

2. The electrical connector of claim 1 wherein said first end cap includes at least one O-ring for engaging said first electrically insulated cable proximate said first end of said connector body.

3. The electrical connector of claim 2 wherein said first end cap includes a molded bend/strain relief effective to absorb strain from cable bending and reduce stretching or opening at the back of the connector, which can create a water entry point and position the cable appropriately as the cable enters the back of the connector.

4. The electrical connector of claim 3 wherein the O-Rings are designed to make positive contact on a primary cable jacket to prevent water entry.

5. The electrical connector of claim 4 wherein the O-Rings remove debris from the primary cable jacket upon insertion and clean away excess particles to reduce the occurrence of future voids in the connection caused by foreign particles.

6. The electrical connector of claim 2 wherein said sleeve is designed to be installed and uninstalled over and over again without losing its properties and positive connection to a ridge of a primary connector of the transformer.

7. The electrical connector of claim 6 wherein the sleeve provides additional strength and support to keep the connection together as the cable is pulled and placed to prevent the connection from coming unplugged.

8. The electrical connector of claim 1 wherein the connector is a component of a kit that is completely serviceable and can be used over and over again.

9. The electrical connector of claim 1 wherein a chemical weld is disposed between said connector body and said first molded plastic end cap.

10. The electrical connector of claim 9 wherein said connector body is formed from a thermoplastic vulcanizate.

11. The electrical connector of claim 10 wherein said molded bend/strain relief includes a plurality of indentations in a circumferential exterior portion of said first end cap.

12. The electrical connector of claim 11 wherein a chemical weld is disposed between said connector body and said first molded plastic end cap.

13. The electrical connector of claim 1 wherein said molded bend/strain relief includes a plurality of indentations in a circumferential exterior portion of said first end cap.

14. The electrical connector of claim 13 wherein a chemical weld is disposed between said connector body and said first molded plastic end cap.

* * * * *